United States Patent [19]

Ohtsuki

[11] Patent Number: 5,101,346

[45] Date of Patent: Mar. 31, 1992

[54] VIRTUAL MACHINE SYSTEM HAVING A PLURALITY OF REAL INSTRUCTION PROCESSORS AND VIRTUAL MACHINES, AND A REGISTRATION TABLE

[75] Inventor: Toru Ohtsuki, Hadano, Japan

[73] Assignee: Hitachi, Ltd., Tokyo, Japan

[21] Appl. No.: 413,068

[22] Filed: Sep. 27, 1989

[30] Foreign Application Priority Data

Sep. 30, 1988 [JP] Japan .................... 63-247089

[51] Int. Cl.⁵ .................................. G06F 12/08
[52] U.S. Cl. ........................ 395/800; 364/228.2; 364/230.3; 364/245.7; 364/256.4; 364/DIG. 1
[58] Field of Search ... 364/200 MS File, 900 MS File

[56] References Cited

U.S. PATENT DOCUMENTS

| | | | |
|---|---|---|---|
| 4,764,864 | 8/1988 | Takane | 364/200 |
| 4,787,026 | 11/1988 | Barnes et al. | 364/200 |
| 4,814,975 | 3/1989 | Hirosawa et al. | 364/200 |
| 4,816,991 | 3/1989 | Watanabe et al. | 364/200 |
| 4,837,674 | 6/1989 | Takane | 364/200 |

FOREIGN PATENT DOCUMENTS 0024434 2/1980 European Pat. Off.

Primary Examiner—Thomas C. Lee
Assistant Examiner—Larry Donaghue
Attorney, Agent, or Firm—Antonelli, Terry, Stout & Kraus

[57] ABSTRACT

A virtual machine system which includes a plurality of virtual machines by using a computer system of a multi-processor configuration having a plurality of real instruction processors and a real main storage which is divided into a plurality of storage regions to be allocated to the virtual machines, respectively. Each of the virtual machines is so organized as not to make access to the regions allocated to the other virtual machines. When one and the same virtual machine includes a plurality of real instruction processors, invalidation of entry of a buffer storage of another real instruction processor as conditioned by execution of a predetermined instruction by a real instruction processor is performed only for the other real instruction processor assigned to the same virtual machine as the real instruction processor and is inhibited from affecting the real instruction processors assigned to the other virtual machines.

4 Claims, 5 Drawing Sheets

F I G. 3A

| ID OF VIRTUAL MACHINE | IP CONFIGURATION VIRTUAL MACHINE | CORRESPONDING REAL IP |
|---|---|---|
| 0 | UNI-PROCESSOR (ONE IP) | $IP_0$ |
| I | DYADIC-PROCESSOR (TWO-$IP_S$) | $IP_1$, $IP_2$ |
| II | UNI-PROCESSOR (ONE IP) | $IP_3$ |

F I G. 3B

| ROW No. \ COLUMN No. | $IP_0$ | $IP_1$ | $IP_2$ | $IP_3$ |
|---|---|---|---|---|
| $IP_0$ | 0 | 0 | 0 | 0 |
| $IP_1$ | 0 | 0 | 1 | 0 |
| $IP_2$ | 0 | 1 | 0 | 0 |
| $IP_3$ | 0 | 0 | 0 | 0 |

~14

VIRTUAL MACHINE SYSTEM HAVING A PLURALITY OF REAL INSTRUCTION PROCESSORS AND VIRTUAL MACHINES, AND A REGISTRATION TABLE

BACKGROUND OF THE INVENTION

The present invention relates generally to an information (data) processing system, and particularly to a virtual machine system suited advantageously for allowing a plurality of operating systems to run on an information processing system.

In field of the information or data processing techniques, there has already been proposed a virtual machine system of multi-processor configuration (or multi-processor virtual machine system) in which a plurality of real instruction processors (IPs) are assigned to and operate for several virtual machines. A technique for supporting such a virtual machine system is described, for example, in "IBM System/370 Extended Architecture Interpretive Execution SA22-7095", January, 1984.

Heretofore, in order to allow a computer system of the multi-processor configuration to operate correctly as an information processing system, such an arrangement has generally been adopted in which when the content of a main storage is updated as the result of an instruction execution in an instruction processor, a signal for invalidation of an entry of each buffer storage which is incorporated in each instruction processor and each of which contains a copy of the content of the main storage, is sent to the individual instruction processors, whereupon the invalidation of the entry of the buffer storage is performed in each instruction processor. Also in the case of the virtual machine system of multi-processor configuration which is implemented so as to operate on the information processing system which has the above-mentioned arrangement with the main storage, the instruction processors and others being divided and allocated to the individual virtual machines, there may arise a possibility that unnecessary invalidation of the entries of the buffer storages incorporated in the virtual machines, respectively, will uselessly be performed even by the instruction processors assigned to the other virtual machines which are not directly relevant to the execution of the instruction, since the signal for invalidating the entry of the buffer storage is issued to all the instruction processors assigned to the virtual machines. Particularly in the case of the information processing system in which the address of the entry of the buffer storage is not defined by using all the bits of the corresponding address of the main storage but by using only a part of the bits, there may arise such situation in which the same entry address of buffer storage may be given for different addresses of the main storage, resulting in that invalidation in excess may be effectuated, whereby the processing efficiency of the whole system will ultimately be lowered to great disadvantage. Further, when an instruction for invalidating the entry of a TLB (address translation buffer) is executed, a signal for invalidating the entry of the TLB is also sent to all the instruction processors, which means that excessive invalidation of the entries of the TLBs may take place in the instruction processors assigned to the other virtual machines. Besides, when the entry address of TLB is defined by a part of the virtual storage address, invalidation in excess may also take place, whereby the processing efficiency of the whole system may unwantedly be degraded.

SUMMARY OF THE INVENTION

It is therefore an object of the present invention to provide a virtual machine system of a multi-processor configuration which can enjoy an improved or enhanced processing capability and efficiency.

For achieving the above and other objects which will be more apparent as description proceeds, there is provided according to an aspect of the present invention an information processing system which includes a plurality of real instruction processors and a main storage allocated to several virtual machines in such a manner that a virtual machine system thus implemented comprises a plurality of virtual machines each including the same number of instruction processor(s) as that of the real instruction processor(s) assigned thereto with the main storages of the individual virtual machines including consecutive storage regions of the real main storage allocated to the virtual machines, respectively, wherein a registration table is provided for registering relations between the instruction processors of the individual virtual machines and the virtual machines.

More specifically, there are registered in the registration table the correspondence relations between the virtual machines and the real instruction processors. Accordingly, assuming, by way of example only, that four real instruction processors are available and that two of the real instruction processors are registered as the real instruction processors belonging to a given one of the virtual machines, the registration table is referred upon operation of the virtual machine system, whereby the influence of operation of one real instruction processor organizing one part of that given virtual machine of multi-processor configuration is confined to the other real instruction processor assigned to the virtual machine thereto (i.e. limited to only the other real instruction processor organizing the other part of the multi-processor virtual machine), without affecting operations of any further real instruction processors assigned to the other virtual machines.

BRIEF DESCRIPTION OF THE DRAWINGS

FIG. 3A shows in a table chart correspondence relations between the virtual machines and the associated real instruction processors;

FIG. 3B shows a structure of a registration table employed in the system shown in FIG. 1 according to the teaching of the present invention;

DESCRIPTION OF THE PREFERRED EMBODIMENTS

Now, the present invention will be described in detail in conjunction with an exemplary or preferred embodiment by reference to the accompanying drawings.

Figure 2:
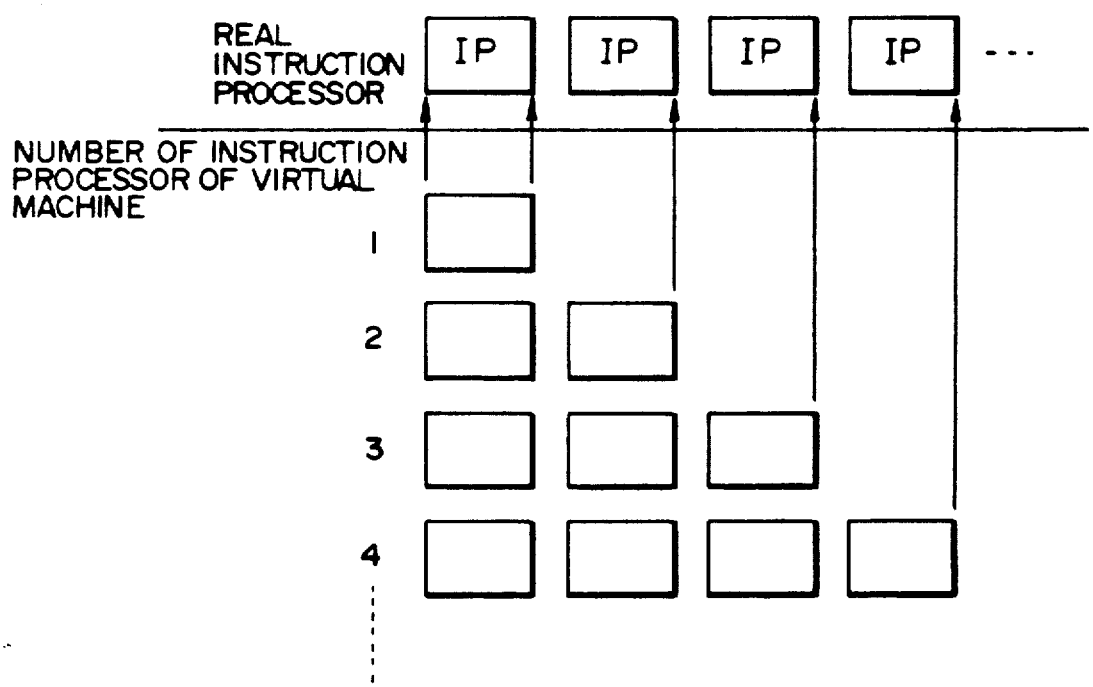
FIG. 2 is a view for illustrating correspondence relations between real instruction processors and virtual machine instruction processors.

FIG. 2 shows correspondence relations between instruction processors constituting the virtual machines and real instruction processors thereto in a preassumed system in which a plurality of real instruction processors (IP) and a main storage are allocated or divided to several virtual machines. More specifically, when one virtual machine includes one instruction processor, i.e. in the case of virtual machine of a uni-processor configuration, the real instruction processor allocated in correspondence to the uni-processor virtual machine is one. On the other hand, when one virtual machine includes two instruction processors, i.e. in the case of the virtual machine of dyadic processor configuration, two real instruction processors are correspondingly assigned to that virtual machine. Similarly, as the number of the instruction processors incorporated in one virtual machine increases, the number of the real instruction processors assigned to that virtual machine is correspondingly increased. The maximum number of the instruction processors which can be allocated to one virtual machine is limited to the number of the real processors implemented in the available processing system as a whole.

Figure 1:
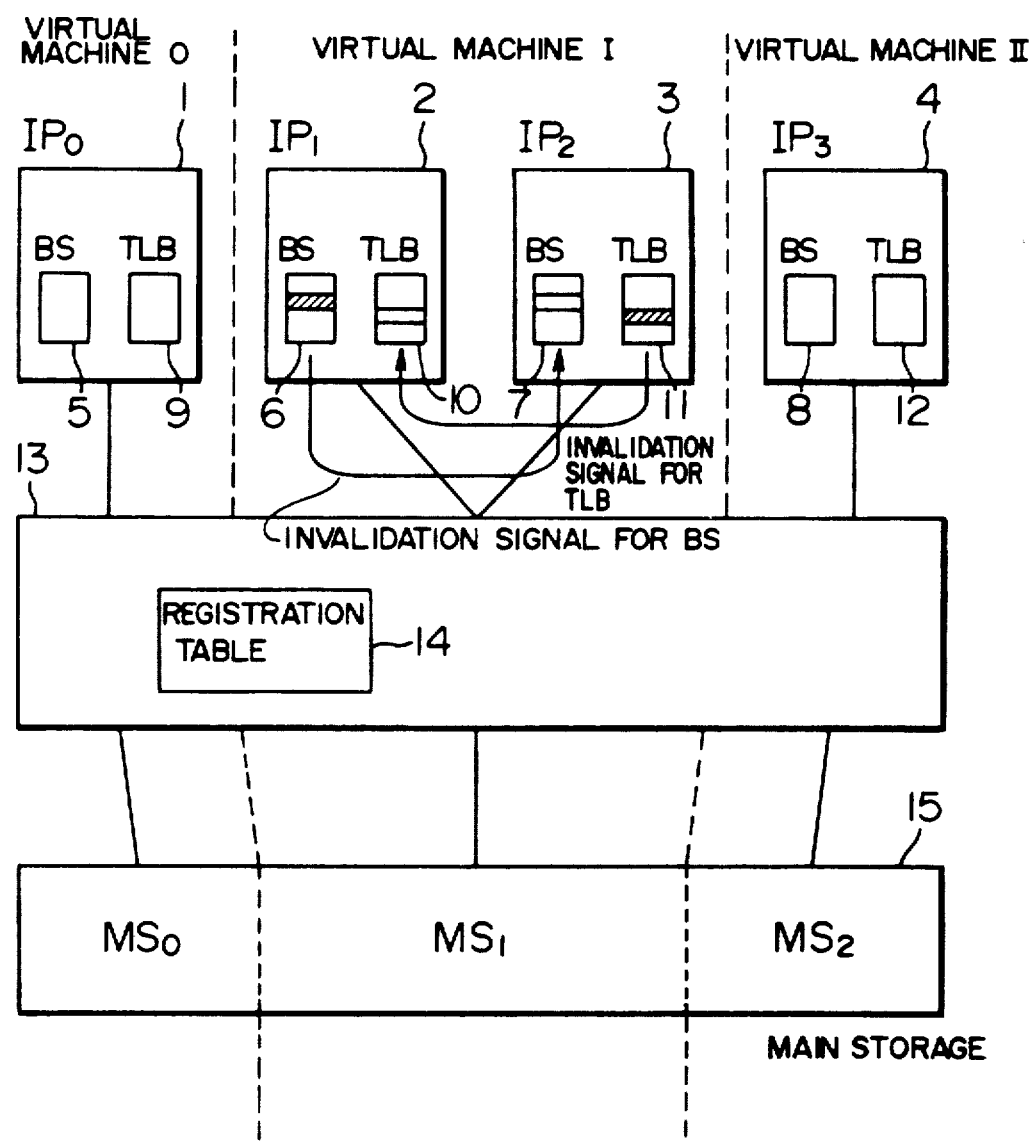
FIG. 1 is a block diagram showing a general arrangement of a virtual machine system according to an exemplary or preferred embodiment of the invention.

FIG. 1 shows a general arrangement of the virtual machine system according to an embodiment of the present invention, in which input/output controllers are omitted from illustration. In the following, description will be directed to the operation for invalidating a buffer storage (BS) entry as well as an address translation buffer (TLB) entry as the invalidating operation which is limited in respect to the range to which the operation exerts influence.

Referring to FIG. 1, a virtual machine 0 is composed of a real instruction processor (IP$_0$) 1 and a buffer storage (BS) 5 and an address translation buffer (TLB) 9 both incorporated in the instruction processor 1 and a storage MS$_0$ consisting of a region of a main storage 15 allocated to the virtual machine 0 by division of the main storage 15. On the other hand, a virtual machine I is composed of a real instruction processor (IP$_1$) 2, a real instruction processor (IP$_2$) 3, buffer storages (BSs) 6 and 7 and address translation buffers (TLBs) 10 and 11 incorporated in the real instruction processors 1 and 2, respectively, and a consecutive storage region MS$_1$ of the main storage 15. Further, a virtual machine II is composed of a real instruction processor (IP$_3$) 4, a buffer storage (BS) 8 and an address translation buffer (TLB) 12 incorporated in the IP$_3$ 4, and a consecutive storage region MS$_2$ of the main storage 15. Operation of the whole system corresponding to MS access is consolidatedly controlled by a system controller (SC) 13 in which a registration table 14 is incorporated. Since the storage regions MS$_0$, MS$_1$ and MS$_2$ are allocated exclusively to the virtual machines 0, I and II, respectively, copies of the main storage 15 which are stored in the storage buffers (BSs) and address pairs for the address translation which are stored in the address translation buffer (TLBs) tables, respectively, of these virtual machines are independent from one to another.

FIGS. 3A and 3B show tables for illustrating correspondence between the instruction processors constituting the virtual machines and the real instruction processors assigned thereto in the system shown in FIG. 1. More specifically, FIG. 3A shows in the form of a table the structural correspondence relations between the virtual machines 0, I and II and the associated real instruction processors IP$_0$ to IP$_3$ assigned thereto, while FIG. 3B shows the corresponding contents placed in the registration table 14. In FIG. 3B, the identification numbers assigned to the instruction processors (IPs) are represented by the row identification numbers, respectively, wherein the identification number of the column in which the row identification number assumes "1" represents the identification number of the counterpart instruction processor (IP) in the virtual machine of the multi-processor configuration (the virtual machine I of dyadic processor configuration in the case of the illustrated embodiment). As can be seen from the table shown in FIG. 3B, it is the instruction processor (IP$_2$) 3 that constitutes the multi-processor (dyadic-processor) virtual machine I in cooperation with the instruction processor (IP$_1$) 2. To say in another way, it is the instruction processor (IP$_1$) 2 that constitutes the dyadic processor virtual machine I in cooperation with the instruction processor (IP$_2$) 3. On the other hand, the row and column numbers IP$_0$ and IP$_3$ represent the uni-processor virtual machines 0 and II, respectively.

Now, it is assumed, by way of example, that an instruction for rewriting the content of the storage region MS$_1$ of the main storage 15 is executed by the instruction processor (IP$_1$) 2. In that case, when the content to be updated is found as stored in the buffer storage (BS) 7 of the instruction processor (IP$_2$) 3 as the result of the abovementioned execution, the entry of the buffer storage (BS) 7 has to be invalidated. To this end, upon execution of the instruction by the instruction processor (IP$_1$) 2, not only the entry of the buffer storage (BS) 6 is updated but also a store request for the storage region MS$_1$ is issued to the system controller (SC) 13. In response, the system controller (SC) 13 sends to the main storage 15 the request for updating the content in the storage region MS$_1$ together with the data to replace, while retrieving the other real instruction processor (IP$_2$) 3 constituting the counterpart in the virtual machine I by referring to the registration table 14, whereupon the system controller (SC) 13 sends a signal for invalidating the entry of the buffer storage (BS) 7 to the counterpart instruction processor (IP$_2$) 3. Upon reception of the BS entry invalidation signal, the instruction processor (IP$_2$) 3 invalidates the content of the buffer storage (BS) 7. In this conjunction, it is noted that in the registration table 14 to referred by the system controller (SC) 13, neither the instruction processor 1 (IP$_0$) nor 4 (IP$_3$) is registered at the entry corresponding to the virtual machine I. Accordingly, no buffer storage invalidation signal is sent to the instruction processor 1 (IP$_0$) or 4 (IP$_3$). Thus, the unnecessary and useless invalidation of the buffer storages 5 and 8 of the instruction processors 1 and 4 respectively can be avoided.

Further, when an instruction which causes invalidation of an entry of the address translation buffer (TLB) 11 is executed by the instruction processor (IP$_2$) 3, the system controller (SC) 13 refers to the registration table 14 to send an invalidation signal of the entry of the address translation buffer (TLB) 10 in the instruction processor (IP$_1$) 2, whereby the entry of the TLB 10 is invalidated.

As will be appreciated from the above description, it is possible to limit, to a necessary and sufficient extent, the range in the virtual machine system affected by the operations of the multi-processor virtual machine by preparatorily providing the registration table 14 in which correspondences between the instruction processors of the individual virtual machines and the real instruction processors allocated thereto are registered.

Figure 4:
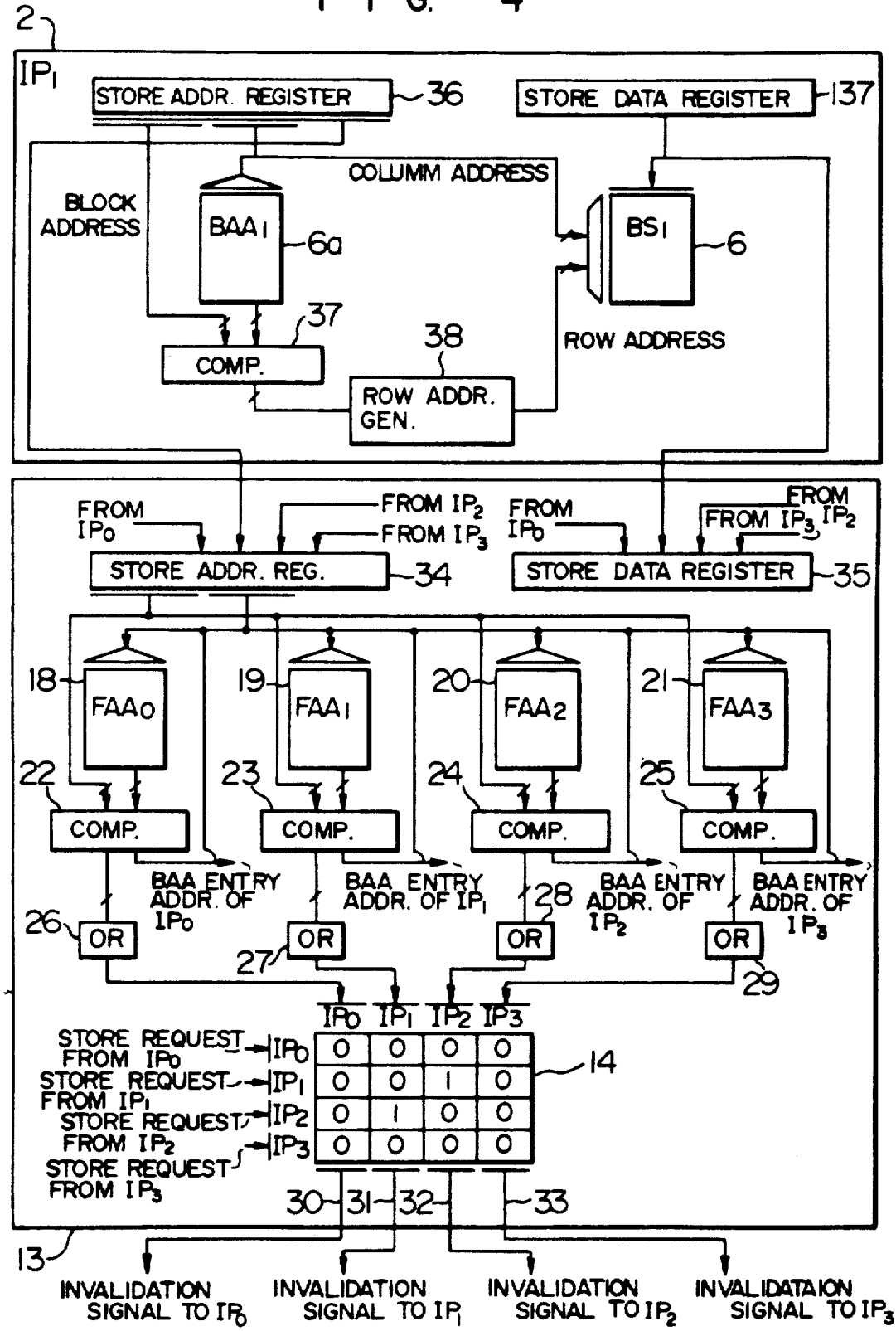
FIG. 4 shows in detail those parts of structures of a real instruction processor (IP) and a system controller (SC) in the system shown in FIG. 1 which are relevant to the present invention.
Figure 5:
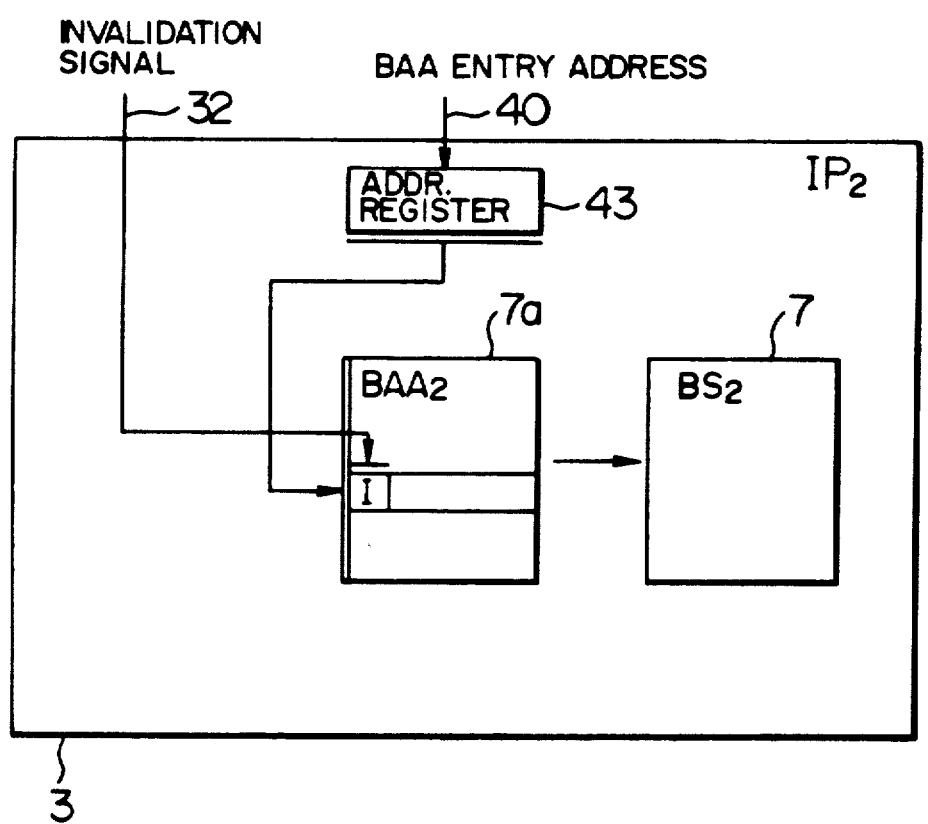
FIG. 5 shows in detail a structure of an instruction processor which constitutes a multi-processor virtual machine in cooperation with another instruction processor.

FIG. 4 shows in detail those parts of the structures of the real instruction processor (IP$_1$) 2 and the system controller (SC) 13 shown in FIG. 1 which are relevant to the present invention, and FIG. 5 shows in detail a structure of the instruction processor (IP$_2$) 3 which constitutes the multi-processor virtual machine I in cooperation with the instruction processor (IP$_1$) 2.

Referring to FIG. 4, upon execution of a store operation by the instruction processor (IP$_1$), a buffer address array (BAA$_1$) 6a serving as the directory of the buffer storage (BS$_1$) 6 is associatively retrieved for determining the entry address of the buffer storage (BS$_1$) 6 by using the address placed in a store address register 36 in the instruction processor (IP$_1$) 2. In other words, by using the block address part and the column address part of the store address as the retrieving key, it is determined associatively whether or not the store address of concern is registered in the buffer address array (BAA$_1$) 6a. i.e. whether a copy of a block of the main storage (MS) 15 is stored in the buffer storage (BS$_1$) 6. When the copy is stored, the entry address of the buffer storage (BS$_1$) 6 consists of a row address part generated through a comparator 37 and a row address generator 38 and of a column address part of the store address in the store address register 36, whereupon a store data in a store data register 137 is stored into the entry designated by the entry address, while an update request and data to be stored are sent to the main storage (MS) 15 through the system controller (SC) 13 for updating the data in the main storage (MS) 1. On the other hand, unless the copy is present in the buffer storage (BS$_1$) 6, data to be stored is sent to the MS 15 by way of the system controller (SC) 13, whereby the content of the block of the MS 15 is updated with a copy of the updated content of the storage block being stored in the buffer storage (BS$_1$) 6. In FIG. 4, reference numeral 35 denotes a store data register, 22 to 25 denote comparator circuits, respectively, and 26 to 29 denote OR circuits, respectively. Further, in FIG. 5, numeral 43 denotes an address register, 7a denotes a buffer address array and 7 denotes the buffer storage (BS$_2$) 7.

In the process described above, the system controller (SC) 13 operates in the manner described below. The system controller (SC) 13 includes address arrays (FAA$_0$, FAA$_1$, FAA$_2$ and FAA$_3$) 18, 19, 20 and 21 which are complete copies of the buffer address arrays (BAA$_0$, BAA$_2$, and BAA$_3$ are not shown) in the individual instruction processors IP$_0$, IP$_1$, IP$_2$ and IP$_3$, respectively. When the store operation is initiated, the address arrays (FAA$_0$ to FAA$_3$) 18 to 21 are associatively retrieved by using the address placed in the store address register 34 in the same manner as the buffer address arrays BAAs is retrieved in the instruction processor. When another instruction processor having a copy of the storage block or region being updated is found, an invalidation signal is sent to the other instruction processor (IP) for invalidating the relevant entry of the buffer storage of that IP.

Referring to FIGS. 4 and 5, it is shown that a copy of the storage block to be updated by the instruction processor (IP$_1$) is stored in the buffer storage (BS$_2$) 7 of the instruction processor (IP$_2$) 3 which constitutes the multi-processor virtual machine in cooperation with the instruction processor (IP$_1$) 2. Thus, when it is found that the buffer address array (BAA$_2$) has the storage block to be updated as the result of the associative retrieval of the address arrays FAA$_0$ to FAA$_3$ in the system controller (SC) 13, the output of the OR circuit 28 which performs the logical ORing of the output of the comparator 24 each other, indicates logical logic "1". The output of the OR circuit 28 is inputted to the registration table 14. When the system controller (SC) 13 checks the registration table 14 and detects that the value at the intersection of the store request 40 from the instruction processor (IP$_1$) 2 (corresponding to the column No. IP$_1$) and the output of the OR circuit 28 (corresponding to the row number IP$_2$) is "1", the invalidation signal to the instruction processor (IP$_2$) 3 is activated. In this conjunction, it should be mentioned that when the address arrays FAA$_0$ to FAA$_3$ is retrieved associatively in the system controller 13, the output of the OR circuit 27 also becomes logic "1". However, at that time, the value at the intersection of the store request from the instruction processor (IP$_1$) 2 and the output of the OR circuit 28 in the registration table 14 is "0". Accordingly, the invalidation signal to the instruction processor IP$_1$ is inhibited from being sent.

Simultaneously, the BAA entry address 40 of the instruction processor (IP$_2$) 3 is determined. Further, as can be seen in FIG. 5, the invalidation signal is sent to the instruction processor (IP$_2$) 3 by way of a line 32 with the BAA entry address 44 being sent to the IP$_2$ through the address register 43 to set an invalidation bit (l) for the entry in the buffer address array (BAA$_2$) 7a. whereupon invalidation of the relevant entry of the buffer storage (BS) 7 is completed.

In the foregoing description of the illustrated embodiment, it has been assumed that the registration table 14 is included in the system controller (SC) 13. It should however be understood that such arrangement may equally be adopted in which the registration table 14 is provided as distributed among the instruction processors (IPs) or copies of parts of the registration table 14 incorporated in the system controller (SC) 13 may be imparted to the instruction processors, respectively.

As will now be appreciated from the foregoing, in a virtual machine system including the multi-processor virtual machine which is required for attaining a high processing capability or efficiency by implementing the functions of the virtual machines by hardware, it is possible according to the teaching of the present invention to limit or confine the range which is affected by the operation of the multi-processor virtual machine to a necessary minimum extent, whereby efficiency of the whole processing system can be enhanced significantly to great advantage.

I claim:

1. A virtual machine system, comprising:
a plurality of real instruction processors assigned to a plurality of virtual machines, each of said real instruction processors being assigned to one of said virtual machines and at least one virtual machine including two or more real instruction processors;
a main storage divided into a plurality of storage regions to be allocated to said plurality of virtual machines, respectively, each of said storage regions being allocated to one of said virtual machines so that the storage region of said one virtual machine does not overlap on that of another virtual machine;

a registration table registering therein correspondence relations between each of said virtual machines and real instruction processors assigned thereto; and control means for responding to execution of a predetermined instruction by a real instruction processor to detect another real instruction processor assigned to the same virtual machine as said real instruction processor, by referring to said registration table, and sending an invalidation signal only to said another real instruction processor when said another real instruction processor is detected.

2. A virtual machine system according to claim 1, wherein said predetermined instruction is an instruction for updating the content of said main storage, said invalidation signal being a signal for invalidating a relevant entry of a buffer storage of said another real instruction processor.

3. A virtual machine system according to claim 1, wherein said predetermined instruction is an instruction for invalidating a relevant entry of an address translation buffer of said real instruction processor, said real instruction processor executes said instruction, said invalidation signal being a signal for invalidating a relevant entry of an address translation buffer of said another real instruction processor.

4. A virtual machine system according to claim 2, wherein said control means includes said registration table, and further includes:

address arrays which are complete copies of buffer address arrays of said real instruction processors;

an address register for storing a main storage address of said predetermined instruction executed by said real instruction processor;

means for searching said address arrays on the basis of the content of said address register to thereby detect said another real instruction processor associated with the address array containing the same address as that stored in said address register; and means for checking whether said detected another real instruction processor assigned to the same virtual machine as said real instruction processor to thereby send said invalidation signal to said detected another real instruction processor assigned to the same virtual machine as said real instruction processor.

* * * * *